Aug. 25, 1936.    E. MYKLEBUST    2,052,106
ANIMAL TRAP
Filed Oct. 8, 1935    2 Sheets-Sheet 1

Inventor
Emil Myklebust
By Clarence A. O'Brien
Attorney

Aug. 25, 1936.    E. MYKLEBUST    2,052,106
ANIMAL TRAP
Filed Oct. 8, 1935    2 Sheets-Sheet 2

Inventor
Emil Myklebust

By Clarence A. O'Brien
Attorney

Patented Aug. 25, 1936

2,052,106

UNITED STATES PATENT OFFICE 2,052,106

ANIMAL TRAP

Emil Myklebust, Battleview, N. Dak.

Application October 8, 1935, Serial No. 44,103

2 Claims. (Cl. 43—92)

The present invention relates to animal traps and one of the objects thereof is to provide an improved form of trigger and release mechanism whereby the trap is easy to set and eliminating danger to the operator thereof.

Another important object of the invention resides in the provision of a trap of this nature which is simple in its construction, comparatively inexpensive to manufacture, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:—

Figure 1:
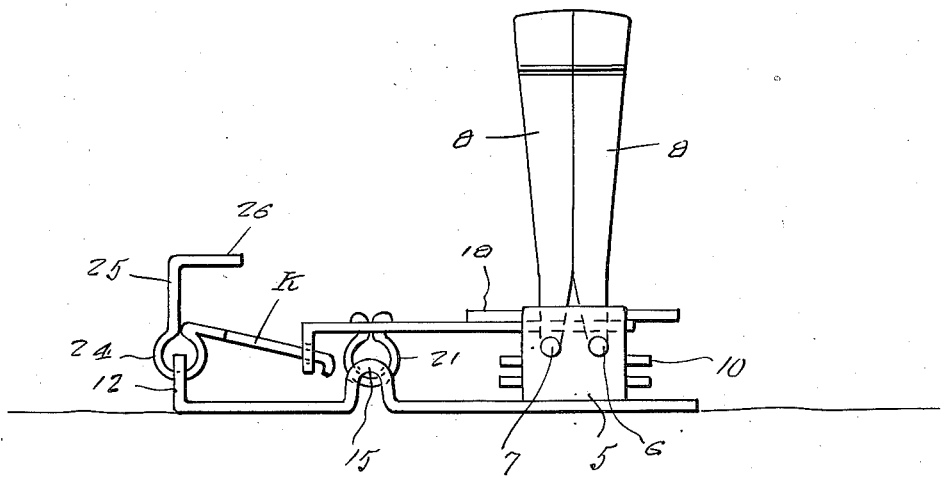
Figure 1 is a side elevation of the trap showing the same sprung.

Referring to the drawings in detail it will be seen that the numeral 5 denotes a base plate having on its ends upstanding ears 6 in which are journaled trunnion terminals 7 on the ends of U-shaped jaws 8. Numeral 9 denotes the conventional spring having the enlarged eye 10 for urging the jaws upwardly to the position shown in Figure 1. The parts thus far described are of conventional construction and well known in the art.

Numeral 11 denotes another base plate having one end portion fixed under the central portion of the base plate 5 and extending laterally therefrom and terminating in an upstanding ear 12 formed with slot 14. An opening A is provided in this base plate 11 in order that plate 5 may be riveted to said plate 11. An upwardly disposed bent portion 15 is provided in the intermediate portion of the plate 11 and is provided with a pair of opposed openings 16. Numeral 17 denotes the trigger plate with the pan or platform 18 on one end thereof and the other end is provided with a depending ear 19 having a slot 20 formed therein. An eye 21 is fixed in an opening 22 of the trigger plate 17 and extends through the eyes 16 for rockably mounting the trigger on the bent portion 15.

A keeper member is denoted generally by the letter K and includes a ring-like bight portion 24 from which extends arms 25 and 28 at an obtuse angle to each other. The arm 25 is provided with an inwardly directed extension 26 to engage over one of the jaws 8 as illustrated to advantage in Figure 2. The arm 28 is adapted to extend through the slot 20 of the ear 19 of the trigger plate 17.

Figure 2:
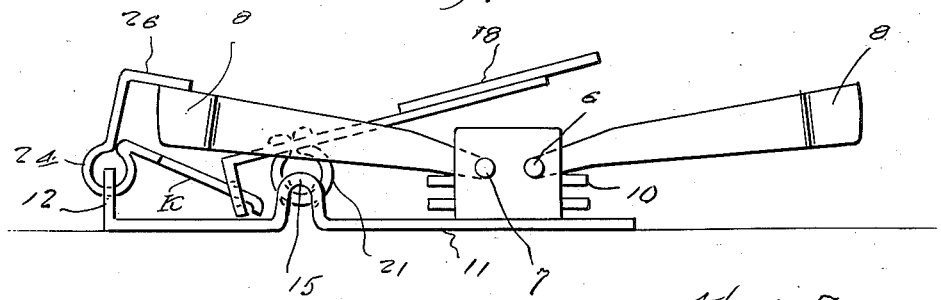
Figure 2 is a similar view showing the same set.
Figures 6, 7:
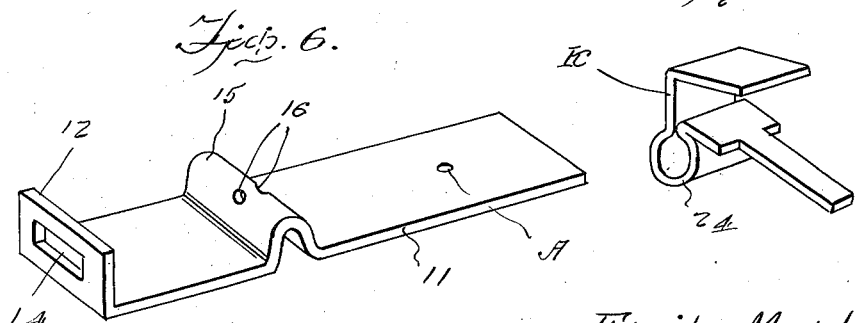
Figure 6 is a perspective view of one of the base plates.
Figure 7 is a perspective view of the keeper member.
Figure 3:
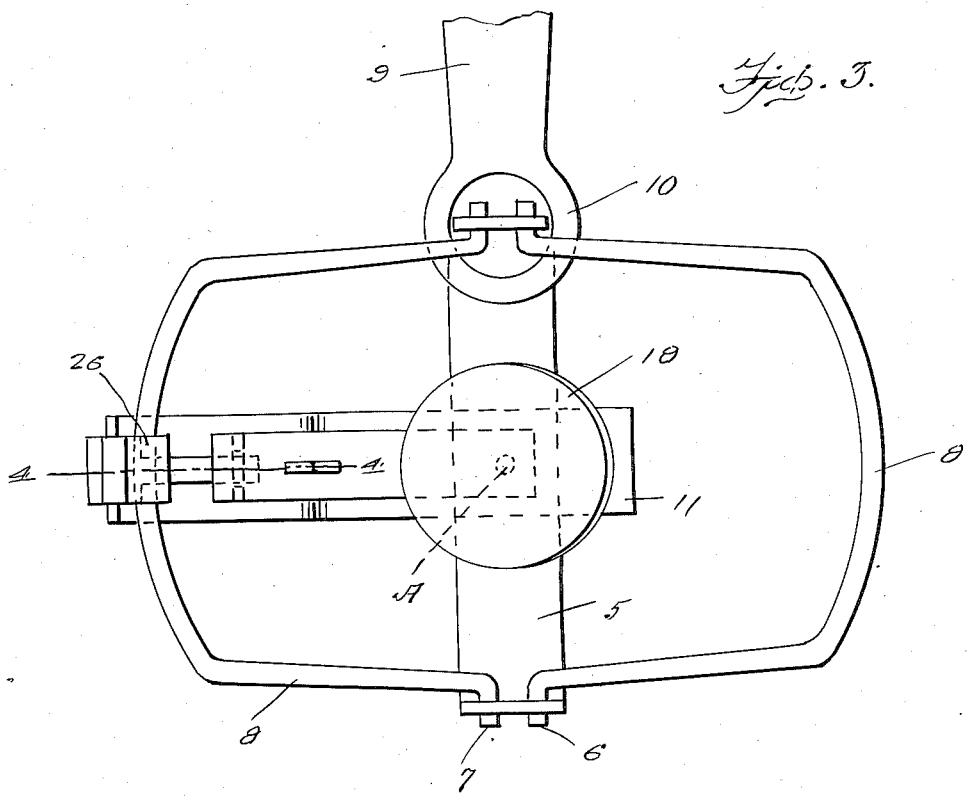
Figure 3 is a fragmentary top plan view of the trap showing the same set.
Figure 4:
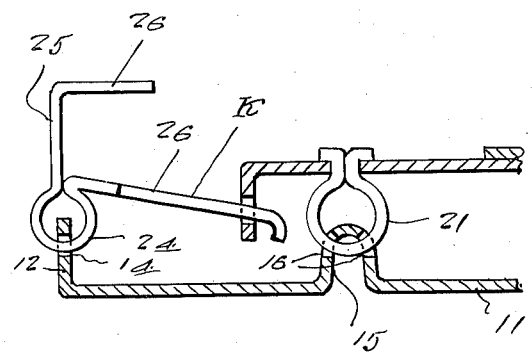
Figure 4 is a detail section taken substantially on the line 4—4 of Figure 3.
Figure 5:
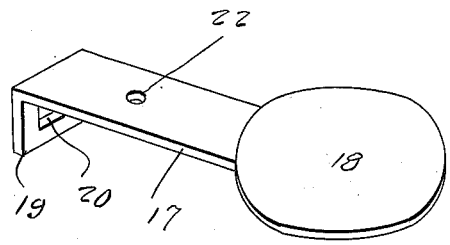
Figure 5 is a perspective view of the trigger.

The trap is shown in set position in Figure 2 and it will readily be seen that when an animal pushes down on the bait pan 18 the keeper K will be rocked so as to release the extension 26 from the adjacent jaw whereby the spring 9 will be free to spring the jaws to the position in Figure 1.

It is thought that the construction, operation, utility and advantages of this invention will now be clearly understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

1. A trap of the class described comprising a base, jaws swingably mounted on the base, means normally holding the jaws together, a trigger, means for rockably mounting the trigger on the base, a keeper, and means for rockably mounting the keeper on the base, said keeper comprising a ring-like bight rockable in a slot of an upstanding ear on the base, arms extending from the bight, one of the arms having an inwardly disposed extension to engage over one of the jaws, the trigger being provided with a depending ear having a slot therein through which the other arm extends.

2. A trap of the class described comprising a base, jaws swingably mounted on the base, means normally holding the jaws together, a trigger, means for rockably mounting the trigger on the base, a keeper, means for rockably mounting the keeper on the base, said keeper comprising a ring-like bight rockable in a slot of an upstanding ear on the base, arms extending from the bight, one of the arms having an inwardly disposed extension to engage over one of the jaws, the trigger being provided with a depending ear having a slot therein through which the other arm extends, said means for rockably mounting the trigger on the base including a bent portion rising from the base and having opposed openings therein, and an eye slidable through the openings and anchored to the trigger.

EMIL MYKLEBUST.